(12) United States Patent
Kato

(10) Patent No.: US 7,275,497 B2
(45) Date of Patent: Oct. 2, 2007

(54) FLOATING THREE-DIMENSIONAL INSTRUMENT PANEL DIAL STRUCTURE

(75) Inventor: Takahira Kato, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 296 days.

(21) Appl. No.: 11/081,981

(22) Filed: Mar. 16, 2005

(65) Prior Publication Data

US 2006/0212162 A1 Sep. 21, 2006

(51) Int. Cl.
*G01D 13/04* (2006.01)
*G01D 13/12* (2006.01)

(52) U.S. Cl. ............... 116/304; 116/62.1; 116/DIG. 36

(58) Field of Classification Search ............... 116/284, 116/286, 287, 288, 302, 304, 305, 62.1, 62.2, 116/62.4, DIG. 5, DIG. 36; 362/26, 27, 362/29, 30
See application file for complete search history.

(56) References Cited

U.S. PATENT DOCUMENTS

| | | | |
|---|---|---|---|
| 2,145,931 A * | 2/1939 | Hills | 116/287 |
| 2,287,554 A * | 6/1942 | Hansen | 116/62.3 |
| RE22,277 E * | 2/1943 | Smith | 116/245 |
| 2,397,175 A * | 3/1946 | Raeburn | 367/107 |
| 2,820,429 A * | 1/1958 | Helgeby | 116/57 |
| 2,905,138 A * | 9/1959 | Norbert | 116/304 |
| 3,665,390 A | 5/1972 | Lee | |
| 4,295,367 A | 10/1981 | Leslie | |
| 4,464,626 A | 8/1984 | Thomas et al. | |
| 5,578,985 A | 11/1996 | Cremers et al. | |
| 5,644,289 A | 7/1997 | Frehner et al. | |
| 5,783,016 A | 7/1998 | Gallagher et al. | |
| D413,295 S | 8/1999 | Sauter | |
| 5,964,514 A | 10/1999 | Carter et al. | |
| 5,971,556 A | 10/1999 | Carter et al. | |
| 6,206,442 B1 | 3/2001 | Breunig | |
| 6,302,551 B1 * | 10/2001 | Matumoto | 362/27 |
| 6,333,697 B1 | 12/2001 | Kumazawa et al. | |
| D487,417 S | 3/2004 | Hsu | |
| 6,802,276 B2 * | 10/2004 | Sugimoto | 116/62.1 |
| D498,191 S | 11/2004 | Nakajima et al. | |
| 2002/0014788 A1 | 2/2002 | Fujita et al. | |
| 2003/0039111 A1 | 2/2003 | Pan | |
| 2003/0207088 A1 | 11/2003 | Inoue et al. | |
| 2004/0070964 A1 | 4/2004 | Lo | |
| 2004/0085746 A1 | 5/2004 | Chen | |
| 2004/0108745 A1 | 6/2004 | Yang | |
| 2004/0173108 A1 | 9/2004 | Inoue et al. | |
| 2004/0212976 A1 | 10/2004 | Mikami | |

FOREIGN PATENT DOCUMENTS

DE     1004043555 A1 *  3/2006

(Continued)

*Primary Examiner*—R. Alexander Smith
(74) *Attorney, Agent, or Firm*—Harness, Dickey & Pierce, PLC

(57) ABSTRACT

A viewed component of a vehicle instrument cluster includes a housing and a first dial structure. The first dial structure includes an outer boundary presenting a first radial portion supported by the housing and a face portion presenting a second radial portion offset within the first radial portion. The face portion includes a series of indicia thereon. A second dial structure is supported between the housing and the first dial structure. The second dial structure presents an inboard plurality of graduations. A plurality of connecting portions extend between and couple the outer boundary and the face portion of the first dial structure.

20 Claims, 3 Drawing Sheets

FOREIGN PATENT DOCUMENTS

| | | | |
|---|---|---|---|
| JP | 2000329591 A | * | 11/2000 |
| JP | 2003042812 A | * | 2/2003 |
| JP | 2005061924 A | * | 3/2005 |
| JP | 2007033082 A | * | 2/2007 |
| SU | 1383095 A | * | 3/1988 |

* cited by examiner

FLOATING THREE-DIMENSIONAL INSTRUMENT PANEL DIAL STRUCTURE

FIELD OF THE INVENTION

The present invention relates to instrument panel gauges in vehicles and more particularly to a an instrument panel gauge presenting a three-dimensional viewing arrangement.

BACKGROUND OF THE INVENTION

Instrument clusters on automobiles generally include a plurality of gauges for displaying such operational information such as vehicle speed, engine RPM, engine temperature, fuel level and many other information. The gauges may include analog or digital readings for displaying the information depending on manufacturer and styling preferences. An analog gauge typically includes a faceplate having indicia thereon such as numbers and a pointer for rotating to the appropriate number.

One important design consideration for an instrument cluster and related gauges is the ability of a vehicle operator to easily view and read the gauges in all driving environments. In particular, nighttime driving requires the instrument cluster to illuminate in some fashion whereby the numbers and corresponding pointers are easily distinguishable.

SUMMARY OF THE INVENTION

A viewed component of a vehicle instrument cluster includes a housing and a first dial structure. The first dial structure includes an outer boundary presenting a first radial portion supported by the housing and a face portion presenting a second radial portion offset within the first radial portion. The face portion includes a series of indicia thereon. A second dial structure is supported between the housing and the first dial structure. The second dial structure presents an inboard plurality of graduations. A plurality of connecting portions extend between and couple the outer boundary and the face portion of the first dial structure.

According to additional features the outer boundary defines a first radial ring having an inboard edge. The face portion defines a second radial ring having an outboard edge. The plurality of connecting portions extend between the inboard edge of the first radial ring an the outboard edge of the second radial ring. The plurality of connecting portions are substantially equally spaced radially between the first and second radial rings. The plurality of connecting portions define a respective plurality of passages between adjacent connecting portions. The plurality of inboard graduations are visible through the plurality of passages.

According to yet other features the plurality of connecting portions define an outboard plurality of graduations that substantially align with each indicia of the series of indicia. A pointer is rotatably disposed in the housing and adapted to rotate within a central opening defined in the face portion of the first dial structure. The second dial structure includes a second plurality of indices thereon.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
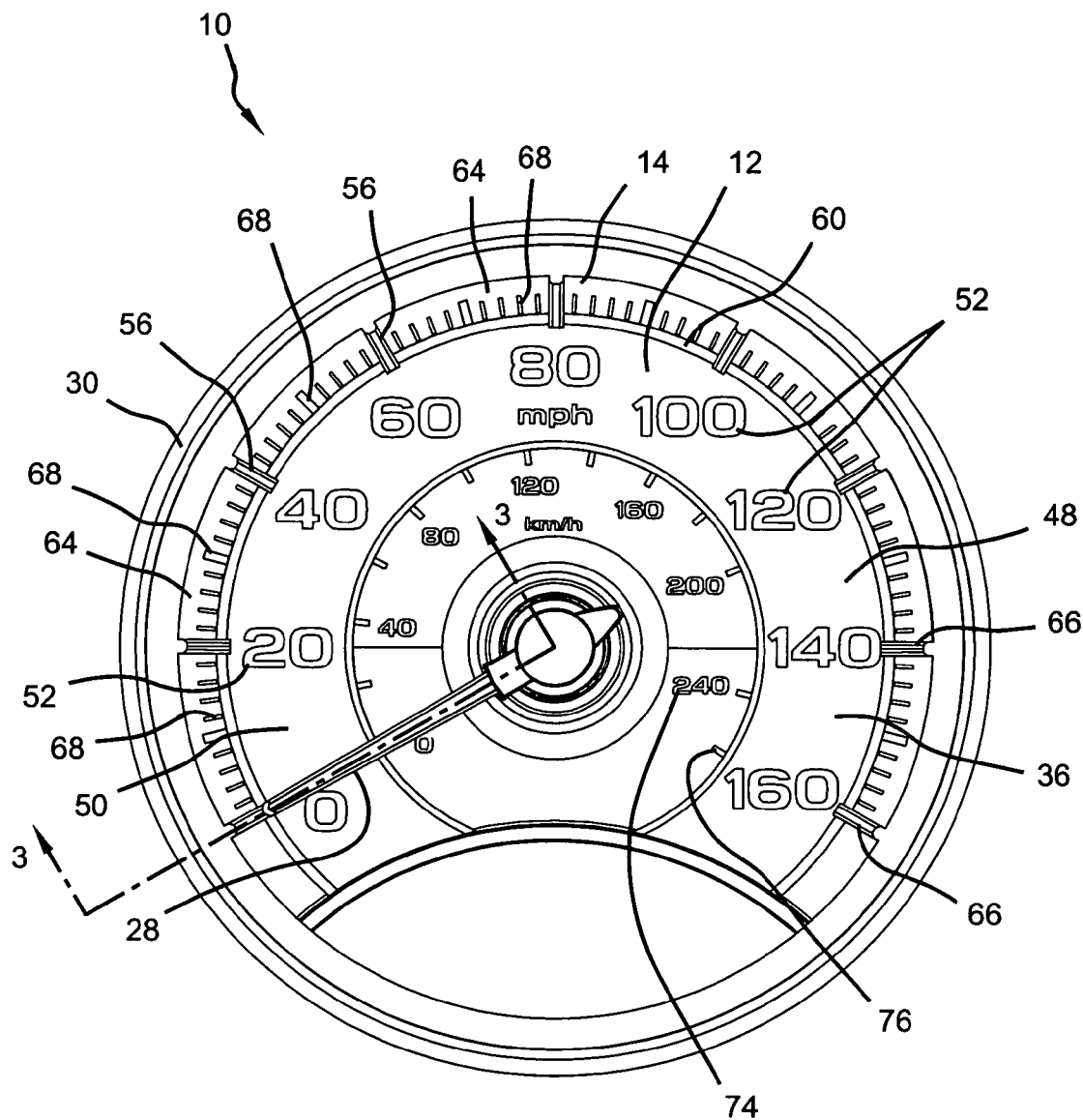
FIG. 1 is a front illustration of a viewed component constructed in accordance with the present teachings.

With initial reference to FIG. 1, a viewed component constructed in accordance to the present teachings is shown and identified generally at reference 10. The viewed component is illustrated as a speedometer. It is appreciated that the viewed component may alternatively comprise other gauges, dials or instruments such as, but not limited to a tachometer, a fuel gauge, a temperature gauge and an oil pressure gauge for example.

Figure 2:
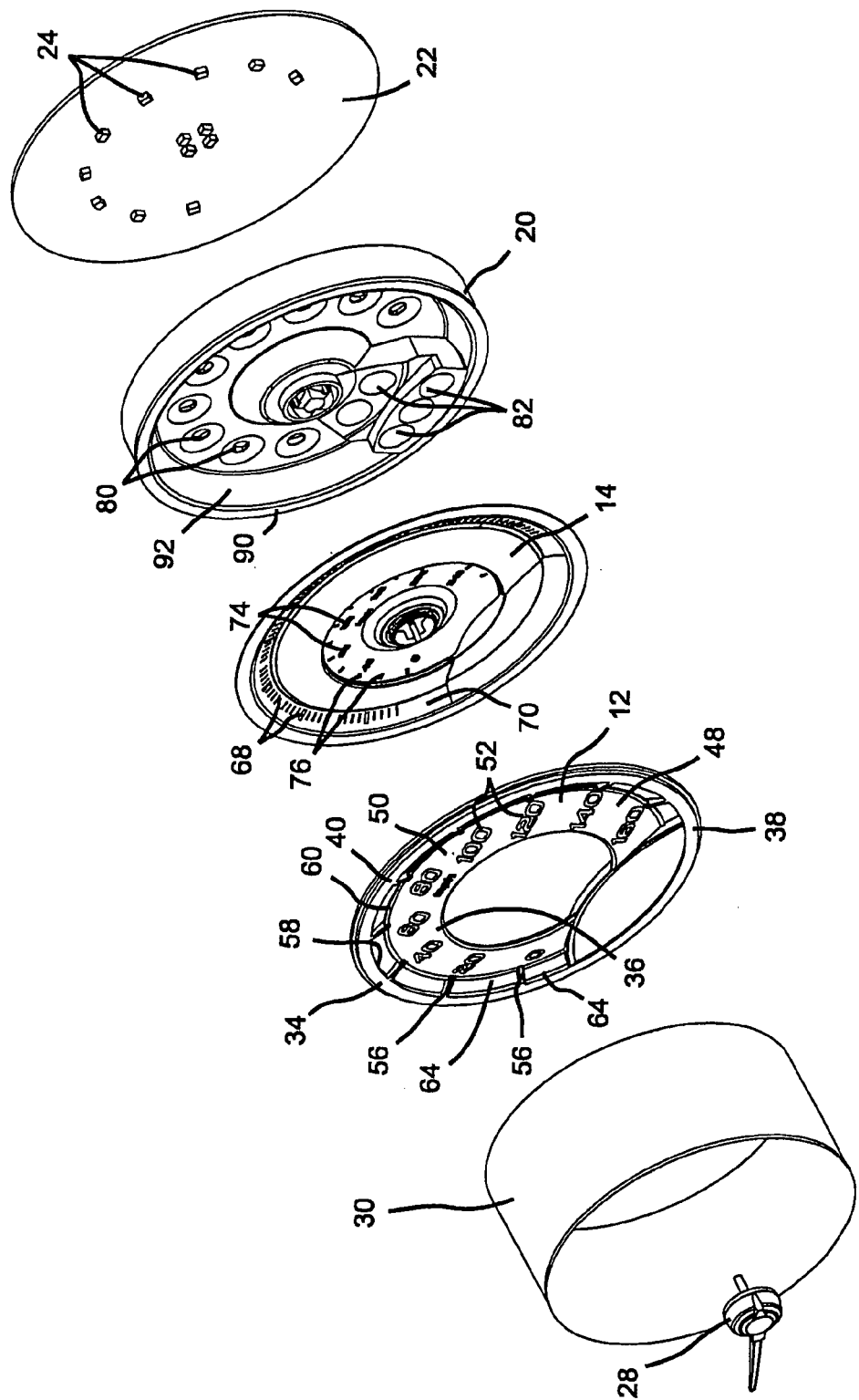
FIG. 2 is an exploded view of the viewed component of FIG. 1.

With reference now to FIGS. 1 and 2, the viewed component 10 generally includes a first dial 12, a second dial 14, a housing 20 (FIG. 2), a printed circuit board 22 having a plurality of light emitting diodes (LEDs) 24 (FIG. 2), a pointer 28 and an outer casing 30. As will be described in greater detail, the viewed component 10 provides a layered viewing surface offering an observer an easily read instrument.

Referencing now all FIGS., the first dial 12 generally defines an outer boundary 34 (FIGS. 2 and 3) and a face portion 36. The outer boundary 34 defines a first radial portion 38 having a first radial ring 40. The face portion 36 defines a second radial portion 48 having a second radial ring 50. The second radial portion 48 is offset within the first radial portion 38 (as best illustrated in FIG. 2) and includes a first series of indicia 52 thereon. While represented as numerical English units (MPH), the first series of indicia 52 may alternatively comprise other markers including Metric units, such as Km/h for example.

A plurality of connecting portions 56 extend between and operatively couple the outer boundary 34 and the face portion 36 of the first dial 12. More specifically, the connecting portions 56 extend between an inboard edge 58 of the first radial ring 40 and an outboard edge 60 of the second radial ring 50. In one example, the first radial ring 40, the second radial ring 50 and the plurality of connecting portions 56 define an integral component. The first dial 12 may be formed of a rigid lightweight material, such as but not limited to plastic.

The plurality of connecting portions 56 are substantially equally placed radially between the first and second radial ring 40 and 50. The plurality of connecting portions 56 define a respective plurality of passages 64 between adjacent connecting portions 56. The plurality of connecting portions 56 define an outboard plurality of graduations 66 (FIG. 1) that are substantially aligned with each indicia of the first series of indicia 52.

With continued reference to FIGS. 1-3, the second dial 14 will be described in greater detail. The second dial 14 defines a first inboard plurality of graduations 68 arranged on a conical surface 70. The first inboard plurality of graduations 68 are viewable through the respective plurality of passages 64 on the first dial 12. The second dial 14 includes a second series of indicia 74 arranged thereon. While represented as numerical Metric units (Km/h), the second series of indicia 74 may alternatively comprise other markings including English units such as MPH for example. A second inboard plurality of graduations 76 are aligned to correspond with the second series of indicia 74. The second dial 14 may be formed of a rigid lightweight material, such as but not limited to plastic.

Figure 3:
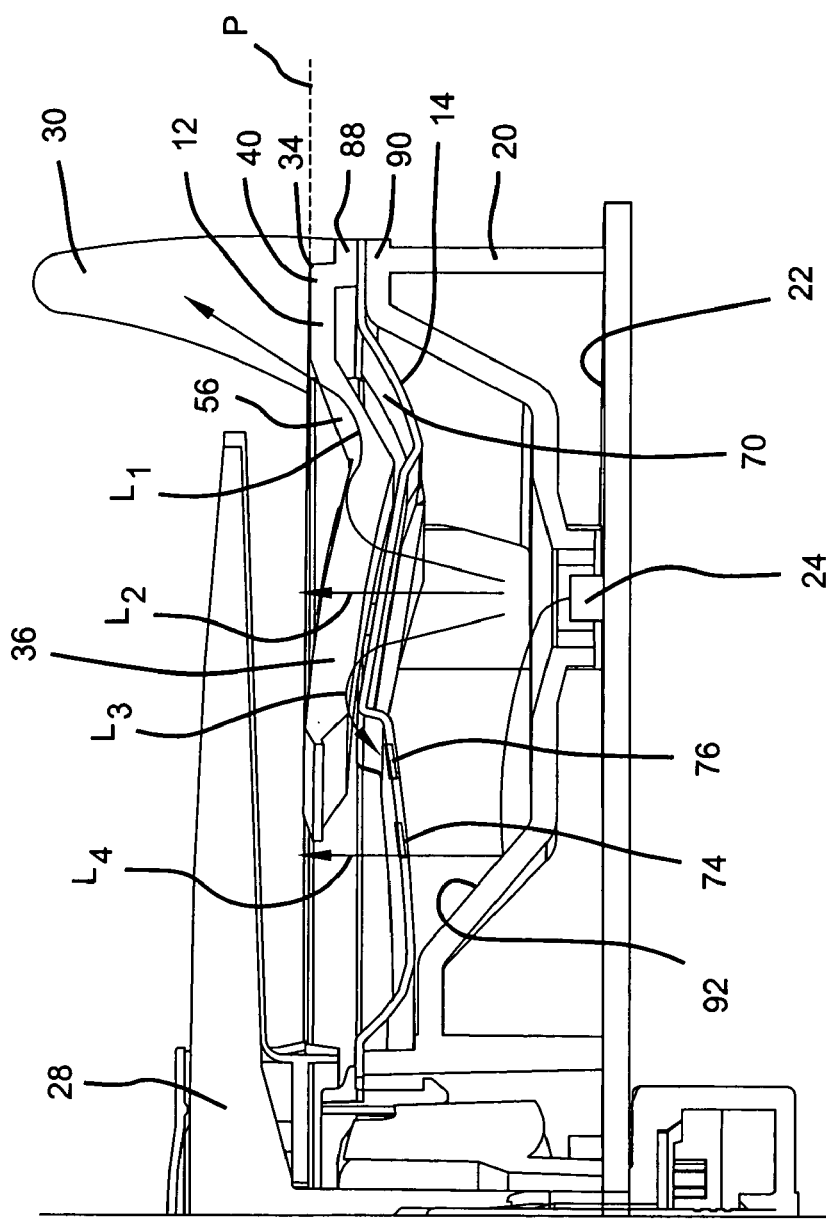
FIG. 3 is a sectional view of the viewed component taken along line 3-3 of FIG. 1.

With specific reference to FIGS. 2 and 3, the housing 20 generally includes a series of apertures 80 formed therearound. The series of apertures 80 provides a passage for light emitted by the LEDs 24 on the printed circuit board 22. The housing 20 further provides a collection of pockets 82 configured to provide light pathways for telltales arranged at a lower portion of the viewed component 10. Other arrangements are contemplated. With reference to FIG. 3, the housing 20 provides structural support for the respective first and second dials 12 and 14 in an assembled position. The housing 20 may be formed of a rigid lightweight material, such as but not limited to plastic.

Referring now to FIGS. 1 and 3, a viewable area of the first dial 12 includes the outboard plurality of graduations 66 and the face portion 36. The outer boundary 34 including the first radial ring 40 is concealed by the case 30. As a result, the outboard plurality of gradations 66 and the face portion 36 appear to be suspended above the second dial 14 and the first inboard plurality of graduations 68. In this way, an observer is provided with an easily viewable layered appearance.

With specific reference now to FIG. 3, the geometry of the viewed component 10 will be further described. The outer boundary 34 generally includes an annular support ledge 88 extending from the first radial ring 40. The annular support ledge 88 is operable to rest atop the second dial 14 and an outer shoulder 90 of the housing 20. The first radial ring 40 defines a first plane P. The connecting portions 56 collectively define a conical contour. The face portion 36 generally defines a sloped surface extending from a first surface substantially on the first plane P to a second surface inboard (shifted in a direction toward the printed circuit board 22) of the first plane P.

Light emitted from the LEDs 24 is represented in FIG. 3 as $L_1$, $L_2$ and $L_3$ respectively. More specifically, light $L_1$ is adapted to pass through, and therefore illuminate the connecting portions 56 (outboard plurality of graduations 66). In one example, the connecting portions 56 are transparent such that the color emitted by the LEDs 24 is passed therethrough. Light $L_2$ is adapted to pass through the first series of indicia 52 (FIG. 1) on the face 36. Light $L_3$ is adapted to reflect off the face 36 and illuminate the second inboard plurality of graduations 76. Light $L_4$ is adapted to reflect off a concave surface 92 of the housing 20 and illuminate the second series of indicia 74. It is appreciated that additional directional light is emitted from the LEDs 24 to illuminate other portions of the viewed component 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A viewed component of a vehicle instrument cluster comprising:
   a housing;
   a first dial structure having an outer boundary presenting a first radial portion supported by the housing and a face portion presenting a second radial portion offset within said first radial portion, said face portion having a series of indicia thereon;
   a second dial structure supported between said housing and said first dial structure, said second dial structure presenting a plurality of inboard graduations; and
   a plurality of connecting portions extending between and operatively coupling said outer boundary and said face portion of said first dial structure, wherein said plurality of connecting portions define an outboard plurality of graduations.

2. The viewed component of claim 1 wherein said outer boundary defines a first radial ring having an inboard edge.

3. The viewed component of claim 2 wherein said face portion defines a second radial ring having an outboard edge.

4. The viewed component of claim 3 wherein said plurality of connecting portions extend between said inboard edge of said first radial ring and said outboard edge of said second radial ring.

5. The viewed component of claim 4 wherein said plurality of connecting portions are substantially equally spaced radially between said first and second radial rings.

6. The viewed component of claim 5 wherein said plurality of connecting portions define a respective plurality of passages between adjacent connecting portions.

7. The viewed component of claim 6 wherein said plurality of inboard graduations are visible through said plurality of passages.

8. The viewed component of claim 5 wherein said plurality of connecting portions define an outboard plurality of graduations that are substantially aligned with each indicia of said series of indicia.

9. The viewed component of claim 8, further comprising a pointer rotatably disposed in said housing and adapted to rotate within a central opening defined in said face portion.

10. The viewed component of claim 9 wherein said second dial includes a second plurality of indices thereon.

11. A viewed component of a vehicle instrument cluster comprising:
    a housing;
    a first dial structure having a first portion presenting a first radial portion supported by said housing and a second portion presenting a second radial portion offset within said first radial portion, said second portion having a series of indicia thereon; and
    a first plurality of graduations extending as bridges between and operatively coupling said first portion and said second portion with opposite ends of said graduations.

12. The viewed component of claim 11, wherein the first portion further comprises an outer boundary, wherein said outer boundary defines a first radial ring having an inboard edge.

13. The viewed component of claim 12, wherein the second portion further comprises a face portion, wherein said face portion defines a second radial ring having an outboard edge.

14. The viewed component of claim 13 wherein said first plurality of graduations extend between said inboard edge of said first radial ring and said outboard edge of said second radial ring.

15. The viewed component of claim 14 wherein said first plurality of graduations are substantially equally spaced radially between said first and second radial rings.

16. The viewed component of claim 15, wherein said first plurality of graduations are a plurality of connection portions, wherein said first plurality of graduations define a respective plurality of passages between adjacent connecting portions.

17. The viewed component of claim 16, further comprising a second dial structure having a second plurality of graduations thereon, wherein said second plurality of graduations substantially align with and are visible through said plurality of passages.

18. A viewed component of a vehicle instrument cluster comprising:
   a housing;
   a first dial structure having a first radial portion supported by said housing and a second radial portion offset within said first radial portion, said second radial portion having a series of indicia thereon;
   a first plurality of graduations extending between and operatively coupling said first radial portion and said second radial portion; and
   a second dial structure supported between said housing and said first dial structure, said second dial structure presenting a second plurality of graduations;
   wherein said first plurality of graduations define a respective plurality of passages between adjacent graduations of said first plurality of graduations and wherein said second plurality of graduations are visible through said plurality of passages.

19. The viewed component of claim 18 wherein said first radial portion defines a first radial ring having an inboard edge and wherein said second radial portion defines a second radial ring having an outboard edge.

20. The viewed component of claim 19 wherein said first plurality of graduations extend between said inboard edge of said first radial ring and said outboard edge of said second radial ring.

* * * * *